United States Patent
Kremer et al.

(10) Patent No.: US 9,467,027 B2
(45) Date of Patent: Oct. 11, 2016

(54) DIRECT CURRENT ELECTRIC MACHINE

(75) Inventors: Thorsten Kremer, Gerlingen (DE); Friedrich Wendel, Weissach (DE); Thomas Klotzbuecher, Rudersberg (DE); Joerg Mayer, Backnang (DE)

(73) Assignee: Robert Bosch GmbH, Stuttgart (DE)

( * ) Notice: Subject to any disclaimer, the term of this patent is extended or adjusted under 35 U.S.C. 154(b) by 794 days.

(21) Appl. No.: 13/877,898

(22) PCT Filed: Aug. 11, 2011

(86) PCT No.: PCT/EP2011/063823
§ 371 (c)(1),
(2), (4) Date: Jun. 21, 2013

(87) PCT Pub. No.: WO2012/045507
PCT Pub. Date: Apr. 12, 2012

(65) Prior Publication Data
US 2016/0190900 A1     Jun. 30, 2016

(30) Foreign Application Priority Data
Oct. 6, 2010   (DE) .................. 10 2010 042 072

(51) Int. Cl.
*F02D 9/08* (2006.01)
*H02K 11/02* (2016.01)
(Continued)

(52) U.S. Cl.
CPC ............... *H02K 11/02* (2013.01); *F02D 9/02* (2013.01); *H01R 39/64* (2013.01); *H02K 5/04* (2013.01); *H02K 7/116* (2013.01); *H02K 11/0094* (2013.01); *H02K 11/30* (2016.01); *F02D 2009/0213* (2013.01)

(58) Field of Classification Search
CPC .......... F02D 11/10; F02D 9/02; F02D 9/107; F02D 9/1065; F02D 2009/0213; H02K 11/02; H02K 11/0094; H02K 11/30; H02K 5/04; H02K 7/116; H01R 39/64
USPC ......................................................... 123/337
See application file for complete search history.

(56) References Cited

U.S. PATENT DOCUMENTS 5,431,141 A * 7/1995 Kanazawa ............. B60K 26/04
                                                                   123/337
6,646,395 B2 * 11/2003 Reimann ................ F02D 9/104
                                                                   123/336
(Continued)

FOREIGN PATENT DOCUMENTS

CN              1633740 A      6/2005
DE   10 2006 055 257 A1        5/2008
(Continued)

OTHER PUBLICATIONS

International Search Report corresponding to PCT Application No. PCT/EP2011/063823, mailed Nov. 21, 2011 (German and English language document) (7 pages).

*Primary Examiner* — Hai Huynh
(74) *Attorney, Agent, or Firm* — Maginot, Moore & Beck LLP

(57) ABSTRACT

The disclosure relates to a direct current electric machine comprising a housing, a rotor having coils configured as electromagnets, and a stator with stator magnets. The rotor and the stator are positioned inside the housing. The electric machine also comprises sliding contacts configured to conduct current which is to be conducted through the coils of the rotor, as a commutator. The electric machine further comprises an interference suppressor configured to suppress electrical interference that emanates from the direct current electric machine. The interference suppressor is positioned outside of the housing.

15 Claims, 5 Drawing Sheets

(51) Int. Cl.
*H02K 5/04* (2006.01)
*H02K 7/116* (2006.01)
*H02K 11/00* (2016.01)
*H01R 39/64* (2006.01)
*F02D 9/02* (2006.01)

(56) References Cited

U.S. PATENT DOCUMENTS 6,756,780 B2 * 6/2004 Hagio ............... B60K 37/02
324/207.2
6,888,062 B1 5/2005 Erickson et al.
7,007,666 B2 * 3/2006 Kamimura ............ F02D 9/1065
123/337
7,215,050 B2 * 5/2007 Anschicks ................ H02K 5/00
310/51

FOREIGN PATENT DOCUMENTS

| | | |
|---|---|---|
| DE | 20 2008 008 644 U1 | 12/2009 |
| EP | 1 538 321 A2 | 6/2005 |
| WO | 03/071661 A1 | 8/2003 |

* cited by examiner

DIRECT CURRENT ELECTRIC MACHINE

This application is a 35 U.S.C. §371 National Stage Application of PCT/EP2011/063823, filed on Aug. 11, 2011, which claims the benefit of priority to Serial No. DE 10 2010 042 072.7, filed on Oct. 6, 2010 in Germany, the disclosures of which are incorporated herein by reference in their entirety.

The present disclosure relates to a direct current electric machine, to a servodrive and to an internal combustion engine.

Background

Direct current electric machines are used in various technical applications as direct current electric motors or as direct current electric generators. Direct current electric machines have a rotor with coils as electromagnets and a stator with stator magnets. In this case, the rotor and the stator are arranged within a housing and sliding contacts are arranged on the rotor as commutator. In this case, the commutator acts as a current-reversing element for supplying electric current to the coils of the rotor and electrical contact is made with the sliding contacts on the rotor by means of two sliding contacts in the form of carbon brushes. In the event of sparking between the carbon brushes and the sliding contacts on the rotor, in particular high-frequency interference signals are produced. These high-frequency interference signals impair other electrical applications in the vicinity of the direct current electric machine. For example when using the direct current electric machine on a servodrive in a motor vehicle, the high-frequency interference can functionally impair radio or television appliances in the motor vehicle.

The direct current electric machines are therefore provided with an interference suppression device in order to decrease the high-frequency interference emanating from the sliding contacts or disconnecting this interference completely. In this case, severe fluctuations in temperature occur within the housing of the electric machine, with these temperature fluctuations being in the range of approximately −40° C. to +160° C. In addition, such direct current electric machines in motor vehicles are subject to high levels of mechanical loading as a result of vibrations. Owing to these severe thermal and mechanical loads occurring on the interference suppression device arranged on the direct current electric machine, only a few of the interference suppression devices available can withstand these loads for any length of time within the housing of the direct current electric machine.

DE 10 2006 055 257 A1 discloses a servodrive for an actuating element, in particular for a butterfly control valve in the intake system of an internal combustion engine, with an actuator housing, in which at least one accommodating chamber with a chamber opening is provided, and with an electric motor fixed in the accommodating chamber, which electric motor has a hollow-cylindrical motor housing with a cylinder wall and at least one end plate arranged at that end of the motor housing which is close to the chamber opening, wherein the end plate has end plate segments distributed over the circumference.

Summary

A direct current electric machine according to the disclosure, comprising a housing, a rotor with coils as electromagnets, a stator with stator magnets, wherein preferably the rotor and the stator are arranged within the housing, preferably sliding contacts for conducting current to be conducted through the coils of the rotor as commutator, an interference suppression device for electrical interference emanating from the direct current electric machine, wherein the interference suppression device is positioned outside the housing.

The interference suppression device is advantageously arranged outside the housing of the direct current electric machine, with the result that the thermal loading on the interference suppression device is thus low. Relatively high temperatures or relatively high temperature fluctuations occur within the housing of the direct current electric machine owing to the waste heat from the stator and the rotor, with the result that an interference suppression device arranged outside the housing of the direct current electric machine is subjected to less thermal loading.

In an additional embodiment, the interference suppression device comprises at least one electronic component part, in particular at least one capacitor, and preferably lines.

In an additional embodiment, the interference suppression device comprises a resistor and/or a transistor and/or a diode as electronic component part.

In a supplementary configuration, the interference suppression device is fastened to or on a printed circuit board.

In an additional variant, the printed circuit board is a circuit board with an electrically insulating carrier material consisting of FR1, FR2, FR3, FR4 or FR5 or a flexible printed circuit board with a film as carrier material.

Expediently, the printed circuit board is fastened to the housing or a holding plate of the direct current electric machine, and preferably the holding plate is part of the housing.

In a supplementary embodiment, the at least one electronic component part is in the form of an SMD component part or in the form of a wired ceramic capacitor.

In an additional configuration, the lines are formed as conductor tracks on the electrically insulating carrier material of the printed circuit board. The interference suppression device comprises at least one electronic component part and lines, in particular in the form of conductor tracks. In this case, the interference suppression device is arranged on the printed circuit board and the electronic component parts in the form of SMD component parts are likewise arranged on the printed circuit board. In this case, the printed circuit boards are produced on the printed circuit board by means of a photochemical method with stamping technology or wiring technology, for example. As a result, different conductor tracks with corresponding electronic component parts can be produced easily on one printed circuit board for different embodiments. During the production of the interference suppression device, for example, another interference suppression device with a different electrical or electronic wiring diagram can be provided merely by changing the software for producing the conductor tracks and by using different or a different number of electronic component parts. It is thus possible to produce different interference suppression devices in a simple manner at low production costs. Owing to the arrangement of the electronic component parts in the printed circuit board, the interference suppression device can in addition withstand in particular mechanical stress, in particular vibrations, well and can be subjected to these permanently without damage thus occurring to the interference suppression device.

In an additional variant, the printed circuit board is fastened on a planar surface of the housing or the holding plate.

In a further configuration, the direct current electric machine comprises a first electrical contact element, in particular a contact plate or a contact pin, and a second electrical contact element, in particular a contact plate or a contact pin.

Preferably, the printed circuit board has one or two openings, and the first and/or second contact element is arranged in the opening or in the openings. The printed circuit board can thus be fastened particularly easily to a housing or a holding plate of the direct current electric machine. In this case, the printed circuit board is pushed onto the two contact elements with both openings, with the result that the two contact elements are arranged within the openings in the printed circuit board and it is then thus easily possible to make electrical contact between the lines, in particular the conductor tracks, of the interference suppression device and the two contact elements, for example by virtue of a flexible contact film being welded to the contact elements, for example by means of ultrasound welding. The flexible contact film can also be connected to the two contact elements by means of other joining techniques, for example soldering.

In a supplementary embodiment, the lines are electrically conductively connected to the first and second contact elements, in particular by means of a flexible contact film.

In a supplementary variant, the direct current electric machine is a direct current electric motor.

A servodrive according to the disclosure for an actuating element comprising a direct current electric motor, a gear mechanism, the actuating element, preferably a servodrive housing, wherein the direct current electric motor is in the form of a direct current electric motor described in this patent application.

In an additional configuration, the actuating element is a butterfly control valve or actuating roller shutter within an intake channel for combustion air for an internal combustion engine.

An internal combustion engine according to the disclosure with a servodrive for an actuating element, wherein the servodrive is in the form of a servodrive described in this patent application.

In one variant, the direct current electric machine is a direct current generator.

In a further configuration, the first and/or second contact element is connected to the line with a preferably flexible contact wire.

Brief Description of the Drawings

An exemplary embodiment of the disclosure will be described in more detail below with reference to the attached drawings, in which.

Detailed Description

Figure 1:
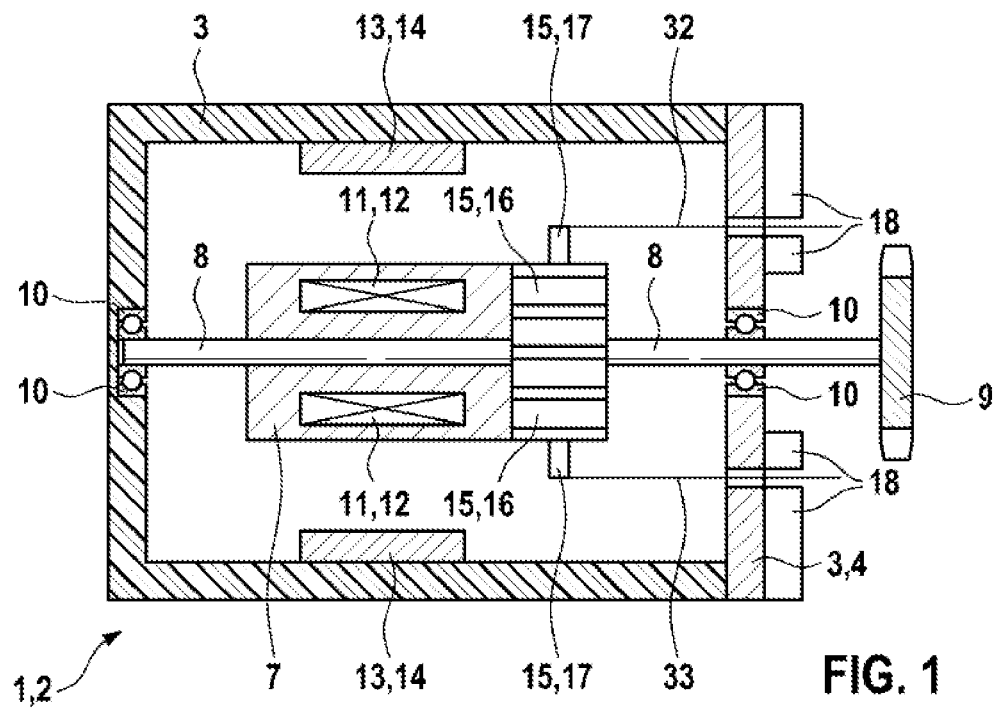
FIG. 1 shows a very simplified cross section through a direct current electric machine.
Figure 3:
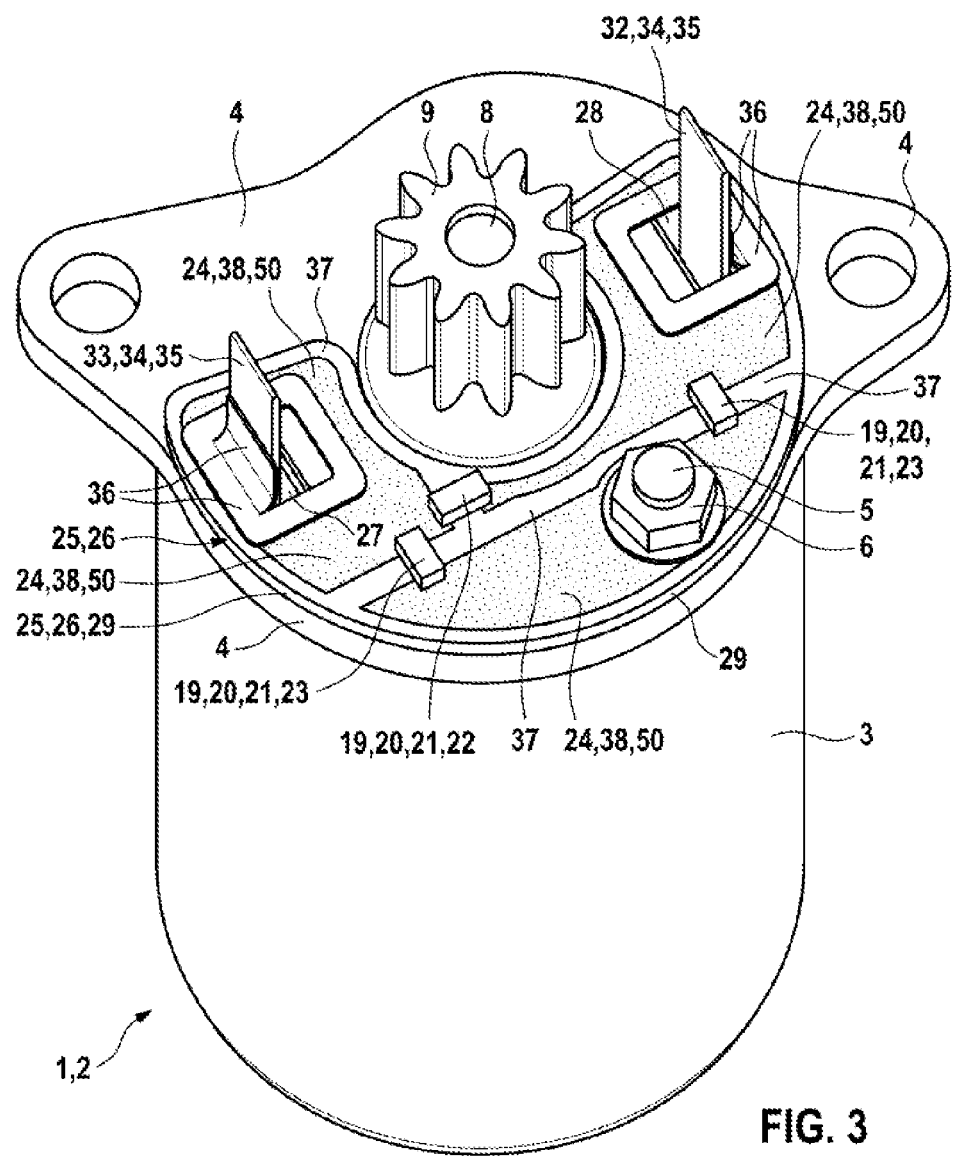
FIG. 3 shows a perspective view of the electric machine shown in FIG. 1 with the interference suppression device shown in FIG. 2.
Figure 6:
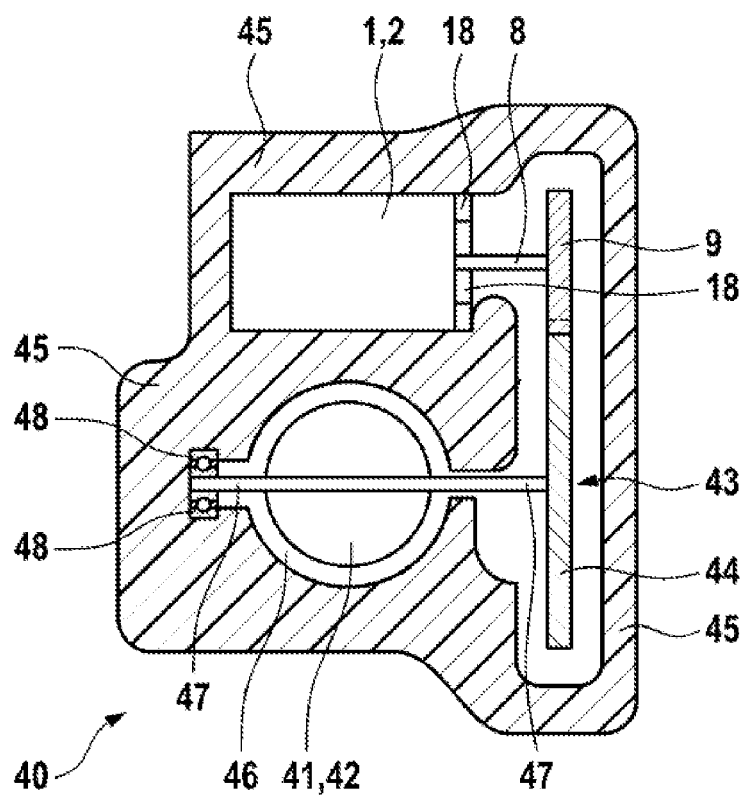
FIG. 6 shows a very simplified cross section through a servodrive with the direct current electric machine shown in FIGS. 1.
Figure 7:
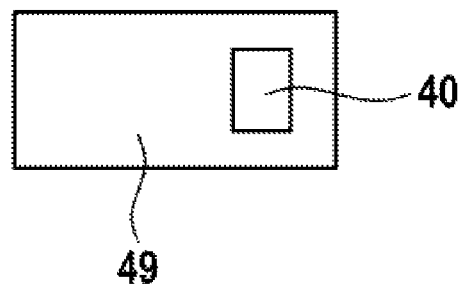
FIG. 7 shows a very simplified illustration of an internal combustion engine with the servodrive.

An electric machine 1 in the form of a direct current electric motor 2 illustrated in FIGS. 1, 3 and 6 is used in a servodrive 40 (FIG. 6) for moving an actuating element 41 in the form of a butterfly control valve 42. The servodrive 40 has a gear mechanism 43 with a first gearwheel 9 on a rotor shaft 8 of the direct current electric motor 2 and a second gearwheel 44. The teeth (not illustrated) on the two gearwheels 9 and 44 mesh with one another, with the result that, by means of a rotary movement of the rotor shaft 8, a butterfly control valve shaft 47 can be set in rotary motion, and the butterfly control valve 42 arranged on the butterfly control valve shaft 47 thus likewise implements a rotary movement. This makes it possible to change the size of the flow cross-sectional area for an intake channel 46 for combustion air of an internal combustion engine 49. The butterfly control valve shaft 47 is mounted on a servodrive housing 45 by means of a butterfly control valve shaft bearing arrangement 48. The direct current electric machine 1, the gear mechanism 43 and the intake channel 46 with the butterfly control valve 42 arranged therein are likewise arranged within the servodrive housing 45. The servodrive 40 is in this case arranged in the vicinity of the internal combustion engine 49 within an engine space of a motor vehicle (not illustrated), with the result that the direct current electric machine 1 is subjected to high mechanical and thermal loads. The internal combustion engine 49 causes mechanical oscillations as vibrations which likewise thus occur on the direct current electric machine 1. In addition, the internal combustion engine 49 emits heat, which likewise results in an increase in the temperature and thus increased maximum possible temperatures at the direct current electric machine 1.

The direct current electric motor 2 has a housing 3 (FIG. 1). Stator magnets 14 are arranged as stator 13 on the housing 3. The stator magnets 14 can in this case be either permanent magnets or electromagnets. A rotor 7 with a rotor shaft 8 implements a rotary movement about an axis of rotation (not illustrated), and the rotor shaft 8 is mounted on the housing 3 by means of a bearing arrangement 10. The rotor 7 has coils 11 as electromagnets 12. In order to energize the coils 11 with current, the rotor 7 is provided with sliding contacts 15 as commutator 16, i.e. as current-reversing element 16. Thus, corresponding to the rotary angle position of the rotor 7, the corresponding coils are energized. This takes place by virtue of the fact that a sliding contact 15 as carbon brush 17 makes contact with the sliding contacts 15 on the rotor 7. The two carbon brushes 17 are electrically and mechanically connected to a first contact element 32 and a second electrical contact element 33. The two electrical contact elements 32, 33 are in this case passed through openings in the housing 3 out of the housing 3 toward the outside of the housing (FIGS. and 1). In this case, that part of the housing through which the two electrical contact elements 32, 33 are passed is in the form of a holding plate 4.

An interference suppression device 18 is arranged on the holding plate 4 as part of the housing 3. When contact is made between the different sliding contacts 15 of the commutator 16 and the carbon brushes 17, the resultant sparking causes high-frequency interference signals, which can result in interference in adjacent electrical applications to the direct current electric machine 1. When using the direct current electric machine 1 in the servodrive 40 of a motor vehicle, this high-frequency interference can thus functionally impair radio or television appliances. In order to at least partially eliminate this high-frequency interference, the direct current electric machine 1 has the interference suppression device 18. The electrical wiring diagram of the interference suppression device 18 is illustrated in this case in FIG. 2. The direct current electric machine 1 as direct current electric motor 2 is connected to a current source (not illustrated) with a positive and a negative terminal. In this case, the electrical current is passed through lines 24 to the first and second electrical contact elements 32, 33 of the direct current electric motor 2. A capacitor 21 in the form of an x capacitor 22 between the two lines 24 for supplying electrical current to the direct current electric motor 2 effects interference suppression of the direct current electric motor 2. In addition, in accordance with the electrical wiring diagram in FIG. 2, two additional y capacitors 23 are connected to the housing 3 of the direct current electric motor 2 and the two lines for supplying direct current to the direct current electric motor 2. The two y capacitors 23 cause additional interference suppression of the direct current electric motor 2.

Figure 2:
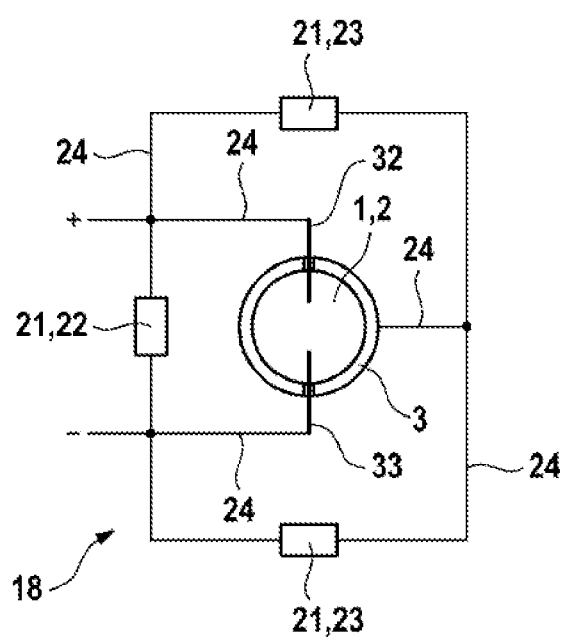
FIG. 2 shows an electrical wiring diagram of an interference suppression device for the direct current electric machine shown in FIG. 1.
Figure 4:
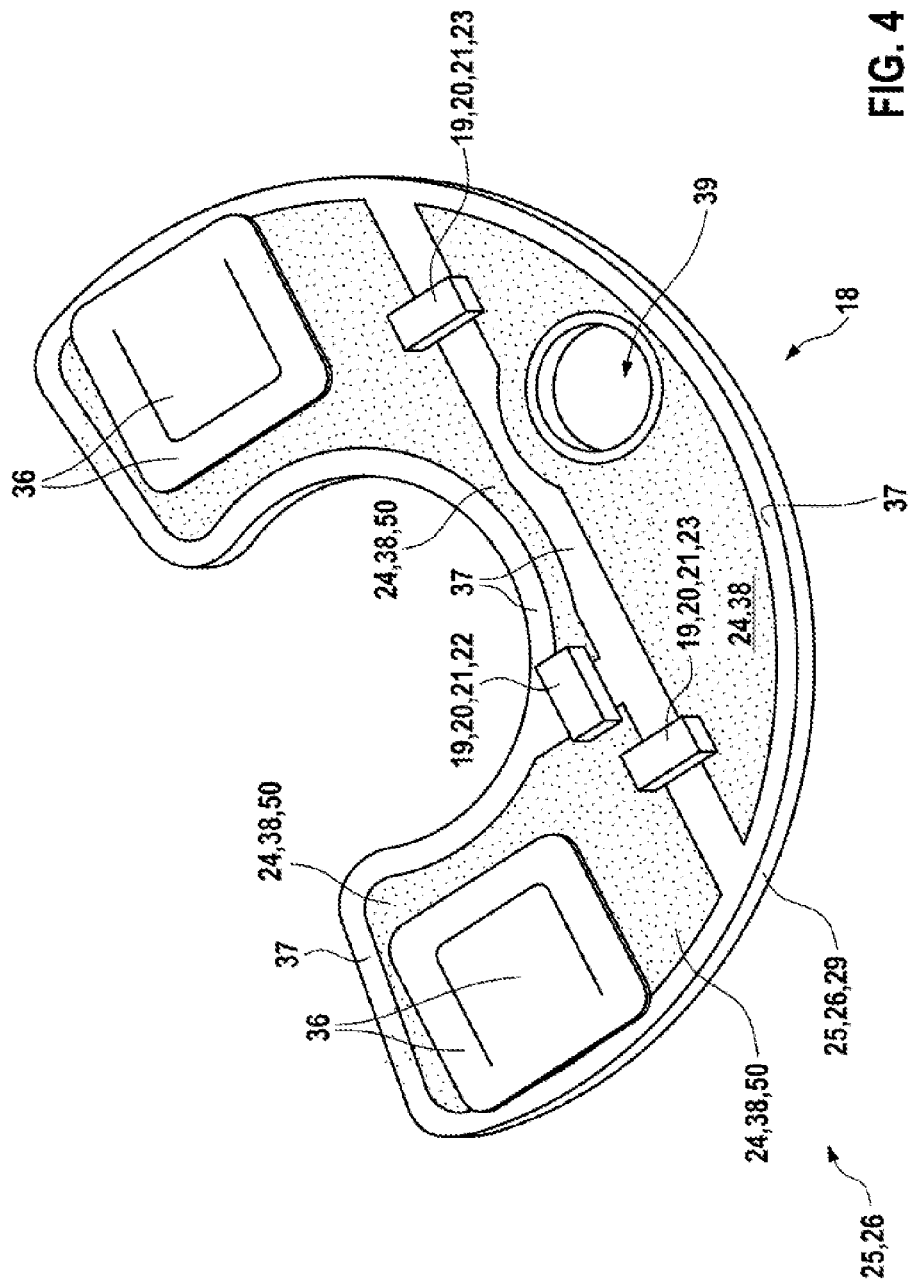
FIG. 4 shows a perspective view of the interference suppression device shown in FIG. 3.

The interference suppression device 18 with the electrical wiring diagram shown in FIG. 2 is in this case arranged on a printed circuit board 25 as circuit board 26. The printed circuit board 25 or circuit board 26 in this case consists of the material FR4 as carrier material 29, i.e. of epoxy resin and fiberglass fabric. The lines 24 are in this case in the form of conductor tracks 50 on the circuit board 26. The conductor tracks are produced photochemically, for example, and consist of a thin layer of copper. The capacitors 21 in the form of electronic component parts 19 are in this case SMD component parts 20. In addition to the conductor tracks 50 as line section 38 on the printed circuit board 25, the printed circuit board 25 also has insulating sections 37. In this case, the insulating sections 37 are bridged by the capacitors 21 as SMD component parts 20 (FIGS. 3 and 4), with the result that the electrical wiring diagram shown in FIG. 2 can be produced on the printed circuit board 25. The printed circuit board 25 has in this case a first opening 27 and a second opening 28 (FIG. 3). The two electrical contact elements 32, 33 in the form of contact plates 34 or contact pins 35 are passed through the two openings 27, 28. In each case one contact film 36 consisting of an electrically conductive material is arranged on the line section 38 of the interference suppression device 18 in the region of the two openings 27, 28. The printed circuit board 25 (FIG. 4) can thus be applied easily to the holding plate 4 and, in the process, the two contact elements 32, 33 are passed through the two openings 27, 28, with the result that, once the printed circuit board 25 has been positioned onto the holding plate 4, the two contact elements 32, 33 are arranged within the two openings 27, 28. As a result, part of the contact film 36 in the form of tabs is likewise also moved upwards and rests on the two contact elements 32, 33. This movable part of the contact film 36 in the form of tabs which is not fastened on the line section 38 is then connected to the two contact elements 32, 33 by means of ultrasound welding. Owing to the mechanical and electrical contact between the contact film 36 and the corresponding line section 38, there is thus an electrical connection between the electrical contact elements 32, 33 and the corresponding line section 38. These two line sections 38 on the two contact elements 32, 33 are bridged only by the x capacitor 22.

The printed circuit board 25 as carrier material 29 for the interference suppression device 18 also has a third opening 39. A bolt 5 is guided on the holding plate 4 through the third opening 39 and the printed circuit board 25 is thus fastened mechanically on the holding plate 4 by means of a screw 6. In addition, the bolt 5 consists of an electrically conductive material, for example metal, in the same way as the screw 6 and the holding plate 4. Thus, in addition to the mechanical contact between the printed circuit board 25 and the holding plate 4 by means of the screw 6 and the bolt 5, an electrical connection is also produced between the line section 38 on the third opening 39 and the holding plate 4. The holding plate 4 and the entire housing 3 consist of an electrically conductive material, with the result that an electrical connection between the housing 3 and the two y capacitors 23 is provided, owing to the electrical connection between the two y capacitors 23 and the line section 38 at the third opening 39. The line sections 38 are in this case illustrated by dots in FIGS. 3 and 4.

Figure 5:
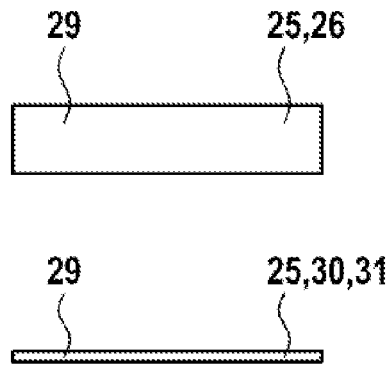
FIG. 5 shows a cross section through a circuit board and a flexible printed circuit board.

Instead of the circuit board 26 consisting of FR4, a film 31 as flexible printed circuit board 30 can also be used as carrier material 29 for the interference suppression device 18, i.e. the electronic component parts 19 and the conductor tracks 50 (FIG. 5). The use of the flexible printed circuit board 30 has the advantage that, firstly, it has a smaller physical height or thickness than the circuit board 26 and secondly also the film 36 is flexible. As a result, less physical space or less physical height is required at the direct current electric motor 2 for the interference suppression device 18 than in the exemplary embodiment illustrated in FIGS. 3 and 4.

The details of the various exemplary embodiments can be combined with one another if no mention is made to the contrary.

Overall, substantial advantages are associated with the direct current electric machine 1 according to the disclosure and the servodrive 40 according to the disclosure. The interference suppression device 18 is arranged on a printed circuit board 25 as a printed circuit and therefore requires little physical space or physical height. The arrangement of the interference suppression device 18 outside of the housing 3 means that the interference suppression device 18 is subject to less thermal stress. Owing to the formation of the interference suppression device 18 as a printed circuit with SMD component parts 20 and conductor tracks 50 on the printed circuit board 25, the interference suppression device 18 can also permanently withstand high mechanical loads. The interference suppression device 18 with the conductor tracks 50 is in this case produced, for example, by means of photochemical methods, with the result that different interference suppression devices 18 can be made available with low production costs merely by changing the software during the production of the conductor tracks 50 on the printed circuit board 25 and the use of other electronic component parts 19 or a different number of electronic component parts 19. In addition, direct current electric machines 1 both with and without an interference suppression device 18 can be provided in the case of an otherwise identical direct current electric motor 2 or an identical direct current electric machine 1. In the case of a direct current electric machine 1 without an interference suppression device 18, no printed circuit board 25 with the corresponding printed circuit is arranged on the holding plate 4 and, in the case of a direct current electric machine 1 with an interference suppression device 18, only the printed circuit board 25 is fastened with the screw 6 on the holding plate 4. As a result, during the production of electric machines 1 for different motor vehicles, otherwise identical electric machines 1 can be produced and these can be provided either with or without an interference suppression device 18. As a result, the production costs for the electric machine 1 can advantageously be reduced.

The invention claimed is:

1. A direct current electric machine, comprising:
    a housing;
    a rotor positioned within the housing and including a plurality of coils configured as electromagnets;
    a stator positioned within the housing and including a plurality of stator magnets;
    a plurality of sliding contacts configured to conduct current to be conducted through the plurality of coils of the rotor as a commutator; and
    an interference suppression device positioned outside of the housing and configured to suppress electrical interference emanating from the direct current electric machine.

2. The direct current electric machine as claimed in claim 1, wherein:
    the interference suppression device includes at least one electronic component part, and
    the at least one electronic component part includes at least one capacitor, and a plurality of lines.

3. The direct current electric machine as claimed in claim 2, wherein the at least one electronic component part further includes an SMD component part.

4. The direct current electric machine as claimed in claim 1, wherein the interference suppression device is (i) fastened to a printed circuit board or (ii) is fastened on the printed circuit board.

5. The direct current electric machine as claimed in claim 4, wherein the printed circuit board is one of (i) a circuit board including an electrically insulating carrier material consisting of FR1, FR2, FR3, FR4 or FR5, and (ii) a flexible printed circuit board including a film configured as the electrically insulating carrier material.

6. The direct current electric machine as claimed in claim 5, wherein the plurality of lines is configured as conductor tracks on the electrically insulating carrier material of the printed circuit board.

7. The direct current electric machine as claimed in claim 4, wherein:
    the housing includes a holding plate, and
    the printed circuit board is fastened to the holding plate.

8. The direct current electric machine as claimed in claim 4, wherein:
    the housing includes a holding plate and defines a planar surface, and
    the printed circuit board is fastened on the planar surface or the holding plate.

9. The direct current electric machine as claimed in claim 1, further comprising:
    a first electrical contact element; and
    a second electrical contact element,
    wherein the first electrical contact element includes one of a first contact plate and a first contact pin, and
    wherein the second electrical contact element includes one of a second contact plate and a second contact pin.

10. The direct current electric machine as claimed in claim 9, wherein:
    the printed circuit board defines one opening or two openings, and
    at least one of the first electrical contact element and the second electrical contact element is positioned in the one opening or in the two openings.

11. The direct current electric machine as claimed in claim 9, wherein the plurality of lines is electrically conductively connected to the first electrical contact element and the second electrical contact element by a flexible contact film.

12. The direct current electric machine as claimed in claim 1, wherein the direct current electric machine is a direct current electric motor.

13. A servodrive, comprising:
    a direct current electric motor including (i) a housing, (ii) a rotor positioned within the housing and including a plurality of coils configured as electromagnets, (iii) a stator positioned within the housing and including a plurality of stator magnets, (iv) a plurality of sliding contacts configured to conduct current to be conducted through the plurality of coils of the rotor as a commutator, and (v) an interference suppression device positioned outside of the housing and configured to suppress electrical interference emanating from the direct current electric machine;
    a gear mechanism;
    an actuating element; and
    a servodrive housing.

14. The servodrive as claimed in claim 13, wherein the actuating element includes a butterfly control valve within an intake channel for combustion air for an internal combustion engine.

15. An internal combustion engine comprising:
    a servodrive including
        direct current electric motor including (i) a housing, (ii) a rotor positioned within the housing and including a plurality of coils configured as electromagnets, (iii) a stator positioned within the housing and including a plurality of stator magnets, (iv) a plurality of sliding contacts configured to conduct current to be conducted through the plurality of coils of the rotor as a commutator, and (v) an interference suppression device positioned outside of the housing and configured to suppress electrical interference emanating from the direct current electric machine,
    a gear mechanism,
    an actuating element, and
    servodrive housing.

* * * * *